United States Patent Office 2,898,246
Patented Aug. 4, 1959

2,898,246
STRIPPING RESIN PAINTS

Alexander Hannah, Dearborn, Mich., assignor to Wyandotte Chemicals Corporation, Wyandotte, Mich.

No Drawing. Application May 25, 1953
Serial No. 357,359

6 Claims. (Cl. 134—38)

The present invention relates to novel alkaline paintstripping compositions and to methods of removing paint from a base material with said novel compositions.

In the course of manufacturing painted articles, some articles fail to meet manufacturing specifications because of defects in the surface coating. Since discarding these articles would entail serious financial losses, efficient methods are needed to remove such defective paint coatings so that the articles can be repainted. Solutions which are used to dissolve and remove such coatings are known in the art as "stripping solutions" and the active components of such baths are known as "stripping compositions."

To be commercially acceptable, a stripping solution must fulfill several important criteria. First, it must be based upon low-cost, widely-available raw materials and must effectively remove or strip a wide variety of paints. Second, it must be rapid in its action. Third, the equipment required for its application must be low in cost and occupy a minimum amount of floor area.

One of the most widely used industrial methods of paintstripping comprises soaking the article in a hot solution of caustic soda and subsequently washing it in a high pressure water spray. Although this method is widely used, it is subject to a number of shortcomings. In particular, the required soaking period in the caustic soda is longer than desired, and the variety of paints that are efficiently stripped therewith is somewhat limited.

It is an object of this invention to prepare more efficient paintstripping compositions, as well as methods of employing such compositions.

Another object of this invention is to prepare more efficient paintstripping compositions that are based upon low cost and widely available raw materials.

Other objects and advantages of this invention will become apparent from the following detailed description thereof.

It has now been discovered that the activity and efficiency of caustic soda paintstripping compositions can be substantially increased by incorporating therein a minor proportion of a polyhydric alcohol having the formula:

where: $n$ is 3 to 5 inclusive. The polyhydric alcohol not only promotes and accelerates the attack of the caustic soda on alkali-susceptible paints, but also renders the compositions effective against paints which are not readily attacked by conventional alkaline strippers.

The polyhydric alcohols which form an essential component of the novel compositions herein disclosed are obtained by the reduction of pentose, hexose and heptose sugars. Examples of such alcohols include d-arabitol, l-arabitol, adonitol, xyletol, d-mannitol, d-sorbitol, d-editol, persitol and volemitol. Since these polyhydric alcohols contain three or more asymmetrical carbon atoms, a wide variety of stereoisomers are possible. However, since the action of the polyhydric alcohol in the paintstripping composition is in no way related to its stereoisomeric structure, all compounds conforming to the generic formula previously set forth are operable in the invention.

The proportion of polyhydric alcohol included in the compositions of this invention may be varied within the limits of from about 2% to about 10%. While proportions of less than 2% may be used, the improved properties which are characteristic of the novel compositions are necessarily reduced. Likewise, proportions in access of 10% may be employed, but the additional improvement in properties is small and usually does not warrant the additional raw material cost. The preferred proportion of polyhydric alcohol lies within the range of from about 3% to about 6%.

As is well known in the art, compositions of the type described may advantageously include wetting and dispersing agents, although these are not essential. In lowering the surface tension of the aqueous solution, the wetting agent promotes penetration of the paint film and disperses the paint throughout the aqueous medium as it is removed from the base material. The wetting agent also promotes rinsing of the base material in the washing step. Since the action of the wetting agent is physical in nature rather than chemical, any of the common wetting agents such as the fatty acid and rosin soaps, the alkylarylsulfonates, the petroleum sulfonates, etc., may be used.

The dry powdered novel compositions of the invention contain a substantial quantity of extremely fine particles and for this reason it is desirable to include a small proportion of a dust allaying agent in the composition. Dust allaying agents may broadly include any compatible, nonvolatile organic liquid and such agents are so well known in the art that they need not be described in detail. Liquid nonionic detergents may be advantageously included in the compositions since they perform a dual function by acting as both a wetting and a dust allaying agent. Other additives which are commonly included in alkaline stripping compositions can similarly be employed in the compositions of the present invention. Soda ash is a cheaper alkali than caustic soda and may be used to replace a portion thereof in the compositions, but not in amounts substantially over 25% of the total composition. Typical of the compositions of this invention is the following formulation:

| Component: | Weight percent |
|---|---|
| Caustic soda | 70–80 |
| Soda ash | 10–25 |
| Polyhydric alcohol | 3–6 |
| Wetting agent | 2–4 |
| Dust allaying agent | Up to 5 |

The concentrations at which the novel compositions of this invention are employed in paintstripping operations depend upon a number of factors, among the most important of which are the following:

(1) The type of paint that is being removed.
(2) The thickness of the paint coat that is to be removed.
(3) The temperature of the stripping bath.
(4) The time that the article to be stripped remains in the stripping bath.

In general, the compositions of this invention are employed at concentrations of from about 2% to about 15% by weight of the total solution, with a preferred range being from about 6% to about 12%. The optimum concentration that should be employed under any given set of conditions can be readily determined by routine experimentation, and the specific concentration at which

3 the novel compositions of this invention are to be employed does not constitute a critical feature of the invention.

The following examples are set forth to more clearly illustrate the principle impractice of this invention to those skilled in the art.

Example 1

A 4% solution of caustic soda was prepared and divided into two aliquot proportions and a small proportion of mannitol (5% based upon the caustic soda) was added to the one aliquot. The solution of caustic soda and the solution of caustic soda containing the mannitol were then evaluated as to paintstripping properties as follows:

Test panels for the paintstripping evaluation are 2" x 4" x 1/16" panels of cold rolled steel. The panels are painted by dipping the steel panels in a red-oxide, alkyd resin-based, primer, allowing the panel to air dry for approximately 60 minutes and finally baking the panel for approximately 30 minutes at 150° F. Two coats of paint are applied in this manner and the thickness of the paint coat is 1.0-1.5 mils.

The effectiveness of the stripping solutions are determined by immersing a minimum of at least 3 panels, as prepared above, in the stripping solution for 3 minutes, while maintaining the stripping solution at 200° F. The panels are observed visually throughout the soaking period and the time required to show the first evidence of paint disintegration is noted. At the end of the stripping period the panels are rinsed under a water tap and their condition is then noted.

With the straight caustic soda solution, 1.5 minutes was required before there was any visual evidence of paint deterioration and at the end of the treatment only a small proportion of the paint was removed. In contrast to these results, the panels that were soaked in the solution containing both caustic soda and mannitol showed evidence of visible attack in only 0.4 minute and essentially all of the paint was removed at the end of the 3 minute soaking period.

Equivalent results are obtained when sorbitol is used in lieu of mannitol under the conditions described in this example.

Example 2

The following paintstripping composition was prepared:

NaOH _____ 93
Mannitol _____ 5
Wetting agent [1] _____ 2

[1] Sulfonated castor oil.

A 4.5% solution of the above paintstripping composition was prepared by dissolving 45 parts of the composition in 965 parts of water. This solution gave the first visible sign of deteriorating on the painted panels in 0.4 minute and removed essentially all of the paint in 3 minutes, when evaluated according to the procedure described in Example 1.

Example 3

The following paintstripping composition was prepared:

NaOH _____ 77
Na₂CO₃ _____ 10
Sorbitol _____ 5
Cresylic acid, sodium salt _____ 5
Tall oil soap _____ 3

Painted panels were prepared as described in Example 1, except that a black, alkyd resin-based, automobile body primer was used in lieu of the paint described in Example 1. Essentially all of the paint was removed from these panels when they were soaked for 30 seconds at 200° F. in a 12% solution of the paintstripping composition described above. In contrast to these results, essentially none of the paint was removed when the panels were soaked under identical conditions in a 12% solution of caustic soda.

Although the compositions of the present invention effectively strip a wide variety of paints, it will be recognized that they will not be effective against all types of protective surface coatings. For example, the compositions of this invention have little effect upon paints which are based primarily upon phenolic and vinyl resins. The compositions are most effective against oleoresinous, ester gum, and alkyd resin based paints.

What is claimed is:

1. A process for removing oleoresinous, ester gum and alkyd resin based paints from articles coated therewith which comprises contacting said coated articles with a hot, aqueous paint stripping solution maintained at a temperature of about 200° F. and consisting of about 85 to 98 percent by weight of water and about 2 to 15 percent by weight of a stripping composition consisting essentially of at least about 70% by weight of sodium hydroxide, about 2 to 10 percent by weight of a polyhydric alcohol conforming to the formula $$CH_2OH(CHOH)_nCH_2OH$$

wherein $n$ has a value from 3 to 5, inclusive, about 2 to 4 percent by weight of a wetting agent selected from the group consisting of fatty acid soaps, rosin soaps, alkylarylsulfonates, petroleum sulfonates, sulfonated castor oil and mixtures thereof, and wherein up to about 25% by weight of said stripping composition is sodium carbonate.

2. A process in accordance with claim 1 wherein the polyhydric alcohol is sorbitol.

3. A process for removing oleoresinous, ester gum and alkyd resin based paints from articles coated therewith which comprises contacting said coated articles with a hot, aqueous paint stripping solution maintained at a temperature of about 200° F. and consisting of about 88 to 94 percent by weight of water and about 6 to 12 percent by weight of a stripping composition consisting essentially of about 70 to 80 percent by weight of sodium hydroxide, about 3 to 6 percent by weight of a polyhydric alcohol conforming to the formula $$CH_2OH(CHOH)_nCH_2OH$$

wherein $n$ has a value from 3 to 5, inclusive, and about 2 to 4 percent by weight of a wetting agent selected from the group consisting of fatty acid soaps, rosin soaps, alkylarylsulfonates, petroleum sulfonates, sulfonated castor oil and mixtures thereof, and wherein up to about 25% by weight of said stripping composition is sodium carbonate.

4. A process in accordance with claim 3 wherein the polyhydric alcohol is sorbitol.

5. A process for removing oleoresinous, ester gum and alkyd resin based paints from articles coated therewith which comprises contacting said coated articles with a hot, aqueous paint stripping solution maintained at a temperature of about 200° F. and consisting of about 85 to 98 percent by weight of water and about 2 to 15 percent by weight of a stripping composition consisting essentially of about 93% by weight sodium hydroxide, about 5% by weight of mannitol and about 2 to 4 percent by weight of a wetting agent selected from the group consisting of rosin soaps, fatty acid soaps, alkylarylsulfonates, petroleum sulfonates, sulfonated castor oil and mixtures thereof.

6. A process for removing oleoresinous, ester gum and alkyd resin based paints from articles coated therewith which comprises contacting said coated articles with a hot, aqueous paint stripping solution maintained at a temperature of about 200° F. and consisting of about 85 to 98 percent by weight of water and about 2 to 15 percent by weight of a stripping composition consisting essentially of about 77% by weight sodium hydroxide, about 10% by weight of sodium carbonate, about 5% by weight of sorbitol, about 5% by weight of the sodium salt of cresylic acid and about 2 to 4 percent by weight of a wetting agent selected from the group consisting of rosin soaps, fatty acid soaps, alkylarylsulfonates, sulfonated castor oil, petroleum sulfonates and mixtures thereof.

References Cited in the file of this patent

UNITED STATES PATENTS

| | | |
|---|---|---|
| 694,658 | Meurant | Mar. 4, 1902 |
| 1,230,668 | Casmire | June 19, 1917 |
| 2,525,166 | Brown et al. | Oct. 10, 1950 |
| 2,584,017 | Dvorkovitz et al. | Jan. 29, 1952 |
| 2,653,860 | Meyer | Sept. 29, 1953 |
| 2,662,837 | Duncan | Dec. 15, 1953 |
| 2,687,345 | Murray | Aug. 24, 1954 |

OTHER REFERENCES

Atlas Sorbitol, pp. 1, 15, 16, 21, pub. by Atlas Powder Co., Wil., Del. (1947).

UNITED STATES PATENT OFFICE
CERTIFICATE OF CORRECTION

Patent No. 2,898,246                                                    August 4, 1959

Alexander Hannah

It is hereby certified that error appears in the printed specification of the above numbered patent requiring correction and that the said Letters Patent should read as corrected below.

Column 1, line 70, for "xyletol" read -- xylitol --; column 2, line 12, for "access" read -- excess --; column 3, line 5, for "impractice" read -- and practice --; line 23, for "are" read -- is --; line 33, for "was" read -- were --; line 48, Example 2, above "NaOH" insert -- Component: --; same line, above "93" insert -- Weight percent --; line 63, Example 3, above "NaOH" insert -- Component: --; same line, above "77" insert -- Weight percent --.

Signed and sealed this 16th day of February 1960.

(SEAL)
Attest:

KARL H. AXLINE
Attesting Officer

ROBERT C. WATSON
Commissioner of Patents